June 22, 1965 H. J. T. MENNBORG 3,190,589
EJECTION SEAT HAVING ROCKET MOTOR FOR SECOND STAGE PROPULSION
Filed Dec. 13, 1963 6 Sheets-Sheet 1

INVENTOR
Hans Jörgen Theodor Mennborg

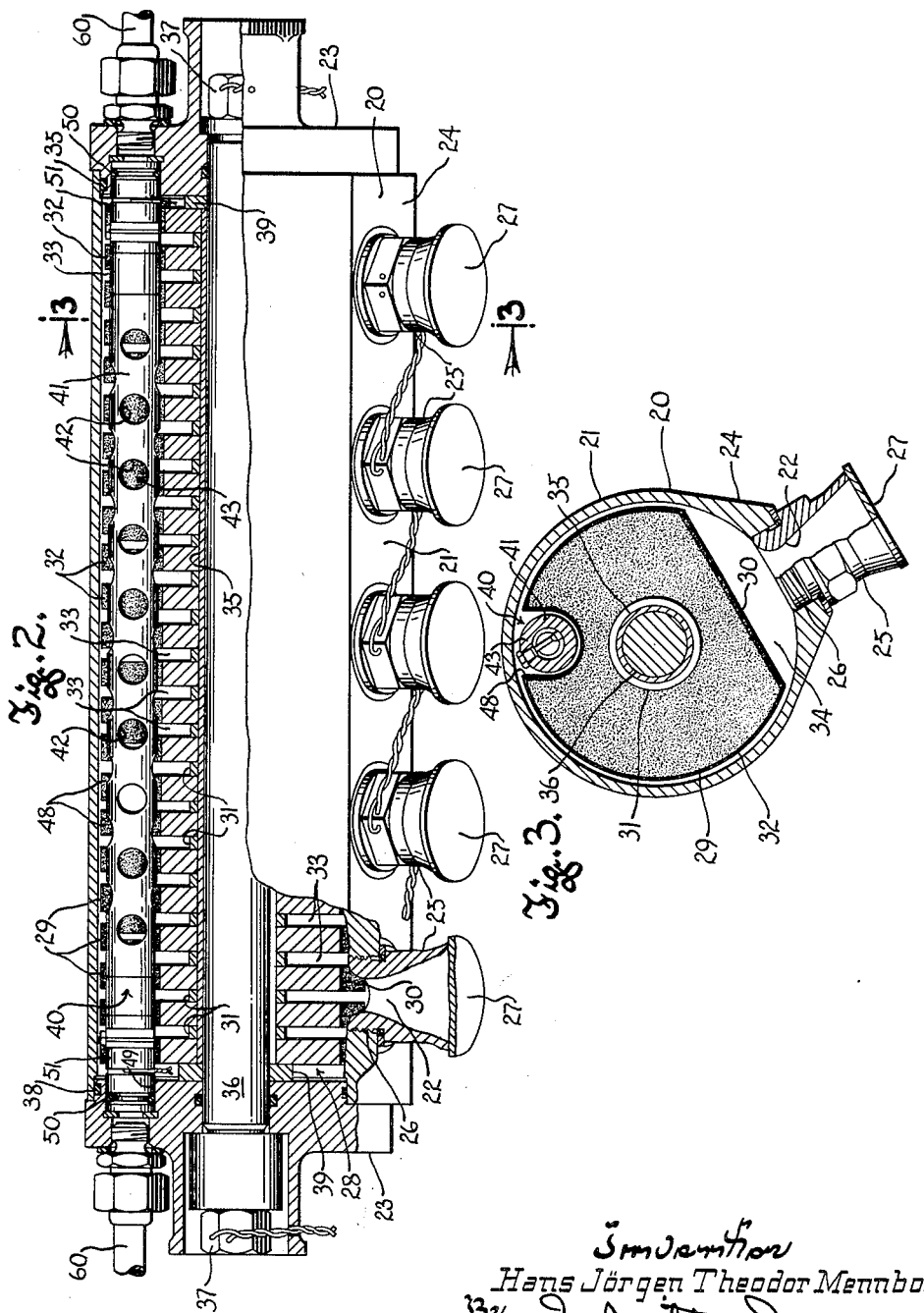

June 22, 1965 H. J. T. MENNBORG 3,190,589
EJECTION SEAT HAVING ROCKET MOTOR FOR SECOND STAGE PROPULSION
Filed Dec. 13, 1963 6 Sheets-Sheet 3
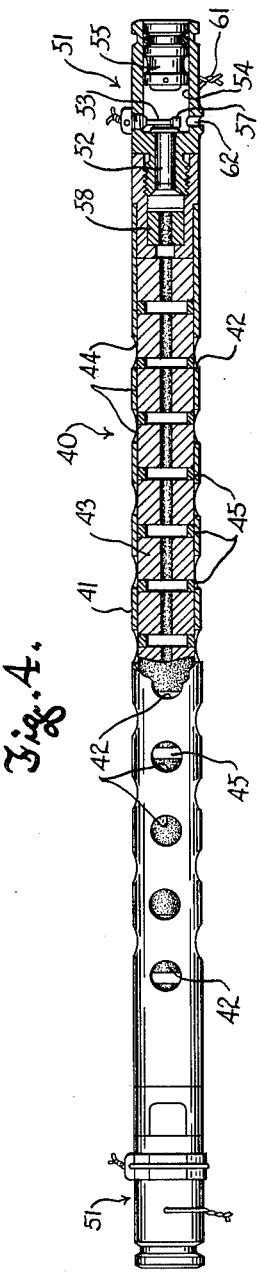
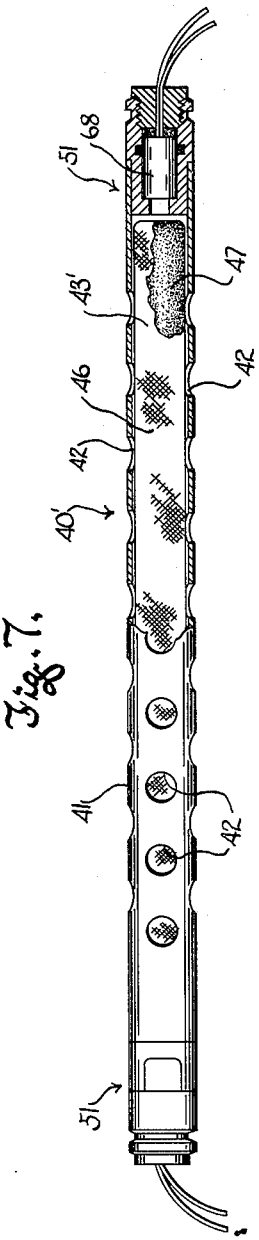

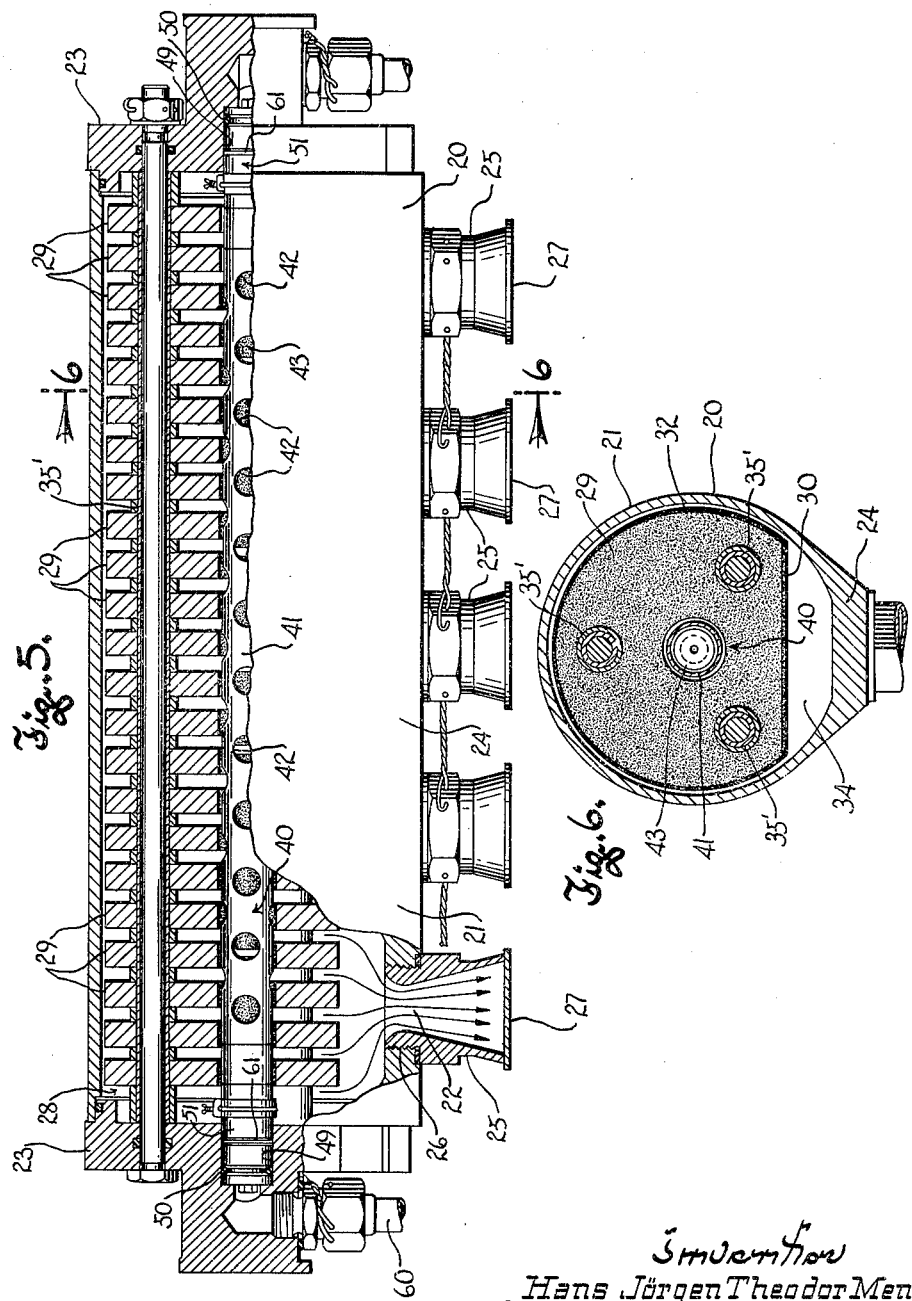

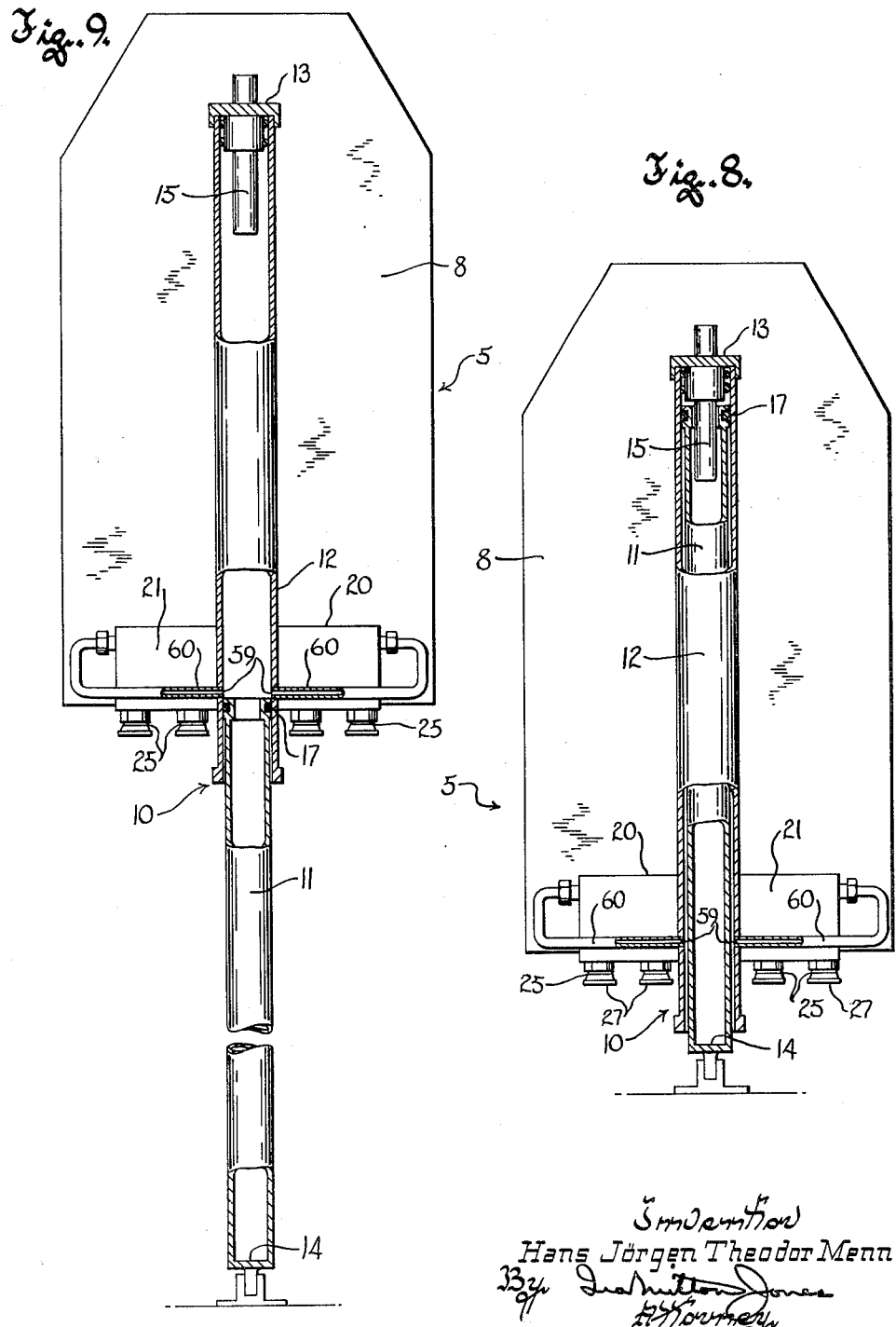

June 22, 1965 H. J. T. MENNBORG 3,190,589
EJECTION SEAT HAVING ROCKET MOTOR FOR SECOND STAGE PROPULSION
Filed Dec. 13, 1963 6 Sheets-Sheet 6

Inventor
Hans Jörgen Theodor Mennborg 3,190,589
EJECTION SEAT HAVING ROCKET MOTOR FOR
SECOND STAGE PROPULSION
Hans Jörgen Theodor Mennborg, Linkoping, Sweden,
assignor to Svenska Aeroplan Aktiebolaget, Linkoping,
Sweden, a corporation of Sweden
Filed Dec. 13, 1963, Ser. No. 330,471
11 Claims. (Cl. 244—122)

This invention relates to escape devices for high speed aircraft and refers more particularly to a two-stage propulsion system for an aircraft ejection seat, of the type comprising a gas pressure gun catapult which provides for first stage propulsion of the seat during its ejection from an aircraft and a rocket motor which provides for second stage seat propulsion.

The high flight velocities of modern combat aircraft have focused attention upon the need for emergency ejection equipment by which an air crew member and his seat can be propelled out of an aircraft along a trajectory that carries him clear of all portions of the aircraft, and particularly its tail surfaces. The most widely used means for propelling an ejection seat is a gun type of catapult comprising a pair of telescoping tubular members that cooperate to define an expansible chamber in which a charge of gun powder or the like is confined. Upon ejection the powder charge is ignited and the resultant combustion gases force apart the telescoped tubular members, accelerating the seat and its occupant vertically out of the airplane. Once the airman is clear of the aircraft, opening of a parachute is initiated either manually or by suitable automatic means carried along with the seat structure.

The telescoping members comprising a gun type of catapult can obviously travel only a relatively short distance before they separate completely, and during that short stroke the catapult has heretofore been relied upon to accelerate the seat to a velocity such that its inertia carries it well above the tail surfaces of the aircraft. As flight velocities have increased, it has become apparent that the catapult gun cannot achieve a satisfactorily high ejection trajectory without subjecting the airman to an insupportably high rate of acceleration during the short stroke of the ejection gun members. For this reason attention is now being given to the employment of rocket motors for the propulsion of ejection seats. In some instances it has been proposed to use a rocket motor as the sole propulsion means, but a more satisfactory arrangement is to couple the rocket motor with a conventional gun type of catapult, utilizing the gun as a first stage propulsion device and relying upon the rocket motor to take over propulsion at that point in the ejection at which the gun catapult produces a lessening acceleration force.

A two-stage propulsion system employing a gun catapult and a rocket motor has the advantage of achieving a relatively high ejection trajectory such that the airman is insured of being propelled clear of obstructions on the aircraft even in very high speed flight; but, perhaps more important, such an arrangement makes possible an emergency escape from an aircraft at very low altitude, or even at ground level, since the airman is carried high enough above the aircraft to permit his parachute to open fully and reduce his forward speed and rate of descent to safe limits.

The general object of the present invention is to provide a two-stage propulsion mechanism for an ejection seat wherein the first stage propulsion means comprises a conventional tubular catapult gun and the second stage propulsion means comprises a novel rocket motor that can be readily so mounted on the ejection seat that its line of thrust is in a predetermined and desirable relationship to the center of gravity of the system comprising the ejection seat, the equipment attached to it, and an airman seated in it, thereby insuring against tumbling of the ejection seat in the course of its ejection trajectory.

Another object of this invention resides in the provision of a two-stage propulsion system for an ejection seat, comprising a conventional catapult gun for first stage propulsion and a rocket motor for second stage propulsion, and wherein operation of the rocket motor is initiated at a predetermined point in the stroke of the gun catapult by means of the apparatus disclosed and claimed in United States Patent No. 2,920,847, to Nils I. Bohlin.

Hence it is another object of this invention to provide an ejection seat having a gun catapult first stage propulsion means and a rocket motor second stage propulsion means, wherein operation of the gun catapult and rocket motor is so synchronized as to provide a smooth and continuous acceleration of the seat during the entire ejection propulsion thereof, with the rocket motor becoming effective to propel the seat at the same time that the catapult gun is beginning to lose propulsive force.

In this connection it is also an object of this invention to provide a two-stage propulsion system for an aircraft ejection seat, comprising a telescoping tube type of catapult for first stage propulsion, a rocket motor for second stage propulsion, and means for coordinating and synchronizing the two propulsion stages, wherein there is no flow of combustion gases from the gun catapult into the casing of the rocket motor or from the rocket motor into the gun catapult tubes, thus assuring that each propulsion means will operate at full efficiency and without interference with the other.

A further and very important object of the present invention resides in the provision of an ejection seat having a two-stage propulsion system of the character described wherein the rocket motor that provides second stage propulsion is capable of achieving high thrust in relation to the fuel consumed by reason of the fact that combustion gas flow from the fuel propellant in the rocket motor to the outlet nozzle means thereof is in a substantially straight and direct line.

Still another object of this invention resides in the provision of a rocket motor which is particularly well adapted for ejection seat propulsion, which is simple and inexpensive in construction, is readily mounted on the underside of an ejection seat pan, and which has the further advantage of insuring that thrust is applied to the seat symmetrically about the vertical plane of symmetry of the seat.

In this connection it is a further object of this invention to provide a rocket motor which is especially suitable for ejection seat propulsion by reason of the fact that it is so arranged that quick and very dependable ignition can be insured, the amount of thrust produced by it can be readily predetermined, and the combustion time of its propellant fuel charge can likewise be readily predetermined.

A further object of this invention is to provide a rocket motor which operates with such rapid ignition of its propellant charge that its propulsion force becomes available almost instantaneously, that is, with the shortest possible interval between the beginning of the ignition impulse and the attainment of full thrust output, and which thereafter maintains a substantially uniform propulsion force until the propellant is completely burned.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention, constructed according to the best modes so far devised for the practical application of the principles thereof, and in which:

FIGURE 2 is a view partly in elevation and partly in longitudinal section, of an ejection seat rocket motor of this invention;

FIGURE 3 is a cross section of the rocket motor taken substantially on the plane of the line 3—3 in FIGURE 2;

FIGURE 4 is a view partly in elevation and partly in longitudinal section of the igniter of the rocket motor shown in FIGURE 2;

FIGURE 5 is a view similar to FIGURE 2 but showing a modified embodiment of the rocket motor;

FIGURE 6 is a cross section of the rocket motor taken on the plane of the line 6—6 in FIGURE 5;

FIGURE 7 is a view similar to FIGURE 4 but showing a modified embodiment of the igniter;

FIGURE 8 is a rear elevation view of an ejection seat embodying the principles of this invention, portions of the catapult gun being broken away and shown in section, and the seat being shown in its normal position in the aircraft;

FIGURE 9 is a view generally similar to FIGURE 8 but showing the apparatus in the course of ejection during the first stage of propulsion, with the tubular elements of the ejection gun just at the position at which ignition of the rocket motor is initiated;

Figure 1:
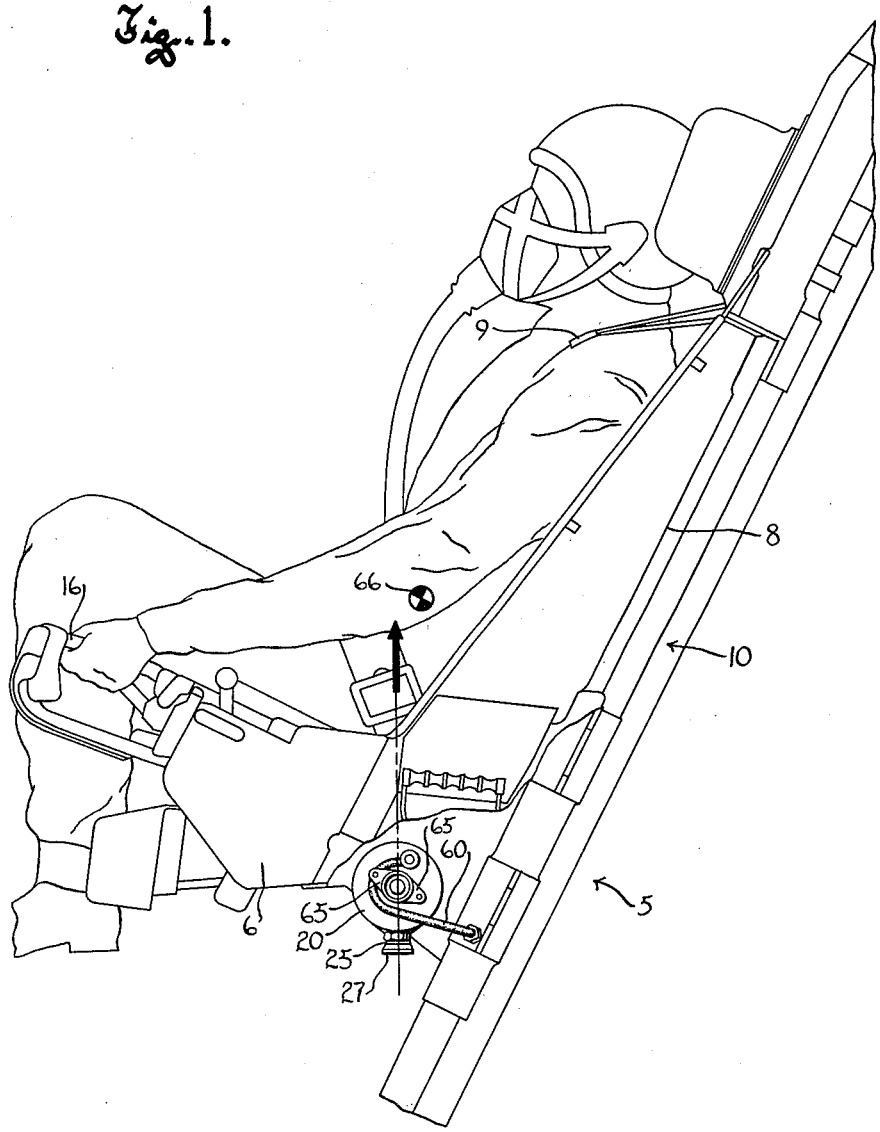
FIGURE 1 is a view in side elevation, with parts cut away, of an ejection seat embodying the principles of the present invention.

Referring now to the accompanying drawings, the numeral 5 designates generally an ejection seat embodying the principles of the present invention and which comprises generally a seat pan or bottom portion 6 upon which an airman can be supported, and a more or less upright back rest 8. The seat, as is conventional, is generally symmetrical about a fore-and-aft extending vertical plane. It will be understood that the seat structure includes provision for attachment of a harness 9 and other items of personal equipment (not shown) such as an emergency oxygen supply bottle, flotation gear, and of course a parachute pack.

For first stage ejection propulsion of the seat there is provided a catapult or gun 10 of a known type, such as that disclosed in United States Patent No. 2,951,420 to Nils I. Bohlin, and which comprises, in general, upright inner and outer telescoped tubular members 11 and 12 (see FIGURES 8 and 9), arranged with their axis on the plane of symmetry of the seat. The outer tubular member 12, which is fixed to the seat back rest 8 to be ejected with the seat, is closed at its upper end, as at 13, while the inner tubular member 11, which is intended to be secured to an aircraft in which the seat is carried, is closed at its lower end, as at 14. The two tubular members thus cooperate to define an expansible chamber in which a charge of readily combustible powder, designated 15, is confined.

When an airman occupying the seat finds it necessary to eject, he actuates a manual control 16 which, by means of known apparatus, sets off the powder charge. The outer tubular member is driven upward by the pressure gases of the combusting charge and carries the attached seat along with it.

The seal between the two tubular members comprises a flange or lip 17 around the upper end of the inner tubular member 11, and hence the pressure gas is effective to drive the tubular members apart until they have completely separated, thus affording the longest possible propulsive stroke for the gun catapult. However the burning of the powder charge is completed at a time when the outer tubular member has moved only part way toward separation from the inner member, and consequently a decreasing thrust force is thereafter imposed upon the closed end of the upper tubular member, resulting in a decreased rate of acceleration of the seat during the final portion of the stroke of the catapult gun.

According to the present invention, the decreasing thrust force of the catapult gun after separation is compensated for by a second stage propulsion means comprising a rocket motor 20 that is mounted beneath the seat pan 6. Operation of the rocket motor is so synchronized with operation of the catapult gun that the thrust output of the rocket motor is increasing at the same instant that the propulsive force of the gun catapult is decreasing, to thus assure a substantially smooth and constant acceleration of the seat as it is moving out of the aircraft; and the rocket motor then continues to exert a substantially constant thrust for a short interval after the seat has left the aircraft, to thus carry the seat occupant through a desirably high trajectory, well past the tail surfaces of the aircraft, and even high enough to permit complete deployment of a parachute in cases where ejection is initiated at or near ground level.

As best seen in FIGURE 2 the rocket motor of this invention comprises an elongated tubular casing 21 having a plurality of axially spaced apart outlets 22 along one side thereof that define gas discharge nozzles, and having its ends closed by plugs or closures 23. The casing has a substantially circular cross section (see FIGURE 3) and its wall is somewhat thickened, as at 24, along the side thereof at which the nozzles are located. Preferably the discharge nozzles comprise suitably shaped nipples 25, each secured in the thicker portion of the casing wall as by means of a threaded connection 26. Each nipple has a displaceable cover 27 over its outlet end which is adapted to be blown off by gas pressure inside the casing that is in excess of a predetermined value. When the rocket motor is not in operation, the covers prevent the entry of dirt and moisture into the casing.

Attention is directed to the fact that the axes of the several outlet nozzles 22 are perpendicular to the casing axis and parallel to one another. Also note that the nozzles are arranged symmetrically with respect to a plane midway between the ends of the casing and normal to the casing axis, which plane coincides with the plane of symmetry of the seat on which the rocket motor is installed.

The propellant charge 28 of the rocket motor comprises a pile of disc-like elements 29 of a solid fuel in the nature of plastic powder or the like having a high but controllable combustion velocity. The several fuel elements can be identical to one another in size and shape. Preferably each element is in the form of a flat disc having a periphery that is circular except along a secant 30 at one side of the disc, and the diameter of each element is somewhat smaller than the inside diameter of the casing, while its thickness is substantially less than its diameter. The fuel elements are arranged at axially spaced intervals along the length of the casing, separated by spacers 31 of felt or similar combustible porous material.

The peripheral surface of each disc-like fuel element has a coating 32 of a known insulating or combustion restricting material, by which combustion is confined to the substantially flat axially facing surfaces of the element. It will be observed that the spacers 31 define radially opening passages 33 between adjacent fuel elements through which gases due to combustion of the fuel elements can flow directly to the nozzle outlets 22. Because there are a number of outlets along the length of the casing, each fuel element is relatively close to an outlet, so that combustion gas can flow from the fuel element to the nearest outlet without substantial change of flow direction, thus assuring efficient conversion of gas pressure into thrust. (See FIGURE 5, wherein the paths of combustion gas flow are indicated by arrows.)

As best seen in FIGURE 3, the peripheral edges of the fuel elements are radially spaced from the adjacent inner surface of the tubular casing wall, and the secant edges 30 of the several fuel elements are oriented toward the thickened wall portion 24 of the casing to provide a greater radial spacing between the fuel elements and the casing at the outlet side of the latter. The spacing between the fuel elements and the casing wall defines a gas passage 34 that extends lengthwise through the casing to insure equalization of combustion gas pressures at the several outlets.

The fuel elements or propellant discs 29 can be formed by molding or machining, and to facilitate their insertion into the casing they can be mounted on a sleeve 35 of stiff cardboard or the like which extends through a central hole in each disc. During assembly of the propellant pile the sleeve is first coated with cement, and then the fuel elements 29, alternating with spacers 31, are slid axially onto it. It will be observed that the advantage of this fuel arrangement is that it facilitates adjustment of the thrust of the motor to a predetermined value, since a motor of greater or lesser thrust can be provided by varying the number of fuel elements in the casing accordingly. Obviously the casing can be lengthened or shortened to obtain a wider range of thrust variation, provided the fuel element pile and possibly also the number of outlets in the casing are correspondingly varied, other elements of the motor, described hereinafter, being also varied accordingly.

The sleeve 35, with the fuel elements and spacers mounted thereon, can easily be inserted axially into the casing during assembly of the motor. A tension rod 36, extending through the sleeve and through both of the end plugs or closures 23, supports the fuel elements in radially spaced relation to the tubular wall of the casing, as described above. Nuts 37, threaded onto the end portions of the tension rod 36, engage the end closures at their outer faces to force them against the ends of the tubular casing body, and gasket rings 38, confined between the plugs and the tubular casing wall, further insure a good seal between the plugs and the tubular body of the casing. To prevent the sleeve 35 from being deformed under compression of the end closures as the nuts 37 are tightened, the length of the sleeve is held somewhat short of the distance between the inner faces of the end closures in the assembled motor, and axial displacement of the sleeve and fuel elements relative to the casing is prevented by relatively soft, compressible end spacers 39 confined between each end of the sleeve and its adjacent end closure.

Combustion of the propellant pile is initiated by means of an igniter 40 comprising a tube 41 of steel or other fire resistant material having numerous apertures 42 along its length and around its circumference and in which there is confined a body 43 of readily combustible quick burning material. The igniter also comprises a pair of detonators 51, one at each end of the igniter, by which the combustible material 43 is ignited.

As shown in FIGURE 4, the combustible material of the igniter is in the form of a plurality of rings or short, thick walled tubes 44 that are held in coaxial relationship by the tube 41 and which are spaced apart along the length of said tube by spacer rings 45 of felt or similar porous combustible material. In the modified form of igniter 40′ illustrated in FIGURE 7, the body 43′ of combustible material comprises an elongated bag 46 which fits within the perforated tube 41 and is filled with a fast burning granular ignition material 47.

Each of the fuel elements 29 can have a radially opening slot or recess 48 substantially opposite its secanted side (see FIGURE 3), and the slots 48 in the several fuel elements are axially aligned with one another in the assembled propellant pile to define a groove in which the igniter is received. The end portions of the igniter are engaged in bores 49 in the end closures of the casing and are sealed to the end closures with annular gaskets 50. Since the igniter extends through the entire length of the casing 21, the flame and combustion gases issuing from its openings 42 can quickly and easily reach all portions of the propellant pile to ignite the fuel elements. Complete ignition of the propellant pile by the igniter is of course further insured by the radially opening passages 33 between fuel elements and by the lengthwise extending passage 34 in the casing. Hence ignition of the entire propellant charge will occur almost instantaneously after the combustible body 43 of the igniter has been set off.

In the embodiment of the igniter illustrated in FIGURES 2 and 4, each of the detonators 51 by which the igniter fuel is set off comprises a small cartridge 52, a firing pin 53, and a servo mechanism comprising a cylinder 54 that is coaxial with the tube 41 and a piston 55 that is axially slidable in the cylinder. The cartridge 52 is received in a small bore that opens coaxially inwardly from the servo cylinder 54. One end of the firing pin 53 is secured in the cylinder wall, and the pin extends transversely to the cylinder axis and across the rear end of the cartridge 52 to hold the latter in place. The firing pin is flexible along its length and is provided with an enlarged head 57 at its free end which can strike the rim of the cartridge 52 to detonate the same. When the cartridge is detonated, the flame issuing from it is augmented by a small annular detonating element 58 mounted between the cartridge and the body 43 of igniter material and which is provided so that a relatively small cartridge can be used for initiating combustion of the combustible charge 43 of the igniter.

The two servo mechanisms at the opposite ends of the igniter are actuated in unison and in synchronism with the upward movement of the outer tubular member 12 of the catapult gun in accordance with the invention disclosed and claimed in the above mentioned Patent No. 2,920,847. For this purpose (see FIGURES 8 and 9) the outer tubular member 12 of the gun catapult has a pair of diametrically opposite outlet ports 59 that are spaced a predetermined distance above its lower end and which are uncovered by the lip 17 on the upper end of the inner tubular member 11 in the course of separation of the tubular members. As the outer tubular member 12 moves upwardly to the point where the lip 17 uncovers the ports 59 (see FIGURE 9), pressure gas from the interior of the gun passes through each port to a duct 60 which communicates the port with the cylinder 54 of one of the servo mechanisms. It will be noted that the axially outer portion of each cylinder 54 is defined by a part of the bore 49 in the end closure in which the end portion of the igniter is received. Normally the piston 55 of the servo mechanism is held spaced from its firing pin by a soft metal locking wire 61, but the pressure gas thus brought to the cylinder from the interior of the catapult gun exerts a sufficient force upon the piston to shear the locking wire and snap the piston axially inwardly, causing the piston to carry the firing pin 53 into percussive engagement with the cartridge 52 and detonate the latter. A vent 62 in the front portion of the cylinder provides for the escape of air therefrom as the piston moves inwardly.

Figure 10:
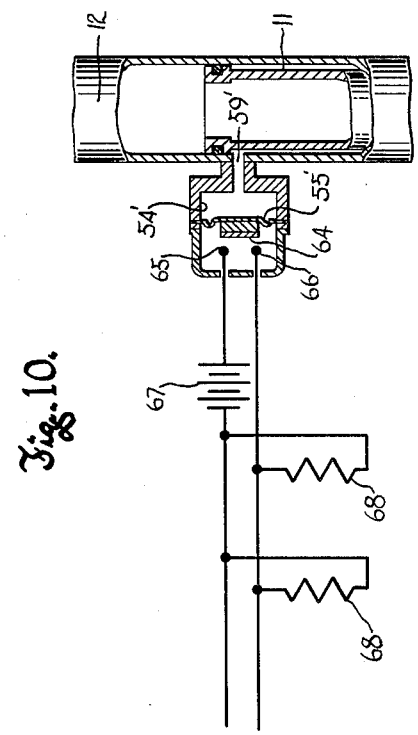
FIGURE 10 is a more or less diagrammatic view of a modified form of rocket motor detonator actuating means.

In the modified embodiment of the igniter illustrated in FIGURES 7 and 10, the servo mechanism comprises a cylinder 54′ communicated with a single port 59′ in the outer tubular member of the gun catapult. In this case, however, a diaphragm 55′ extends across the cylinder and carries a movable electrically conductive contactor 64 that cooperates with a pair of fixed contacts 65 and 66. Normally the contactor 64 is spaced from the contacts 65 and 66, but a pressure impulse due to uncovering of the port 59' deflects the diaphragm to a position at which it engages the contacts to close a circuit comprising a battery 67 or other current source attached to the seat to move therewith and a pair of electric igniter elements 68, one at each end of the igniter. The igniter elements function in a known manner to initiate combustion of the body 47 of combustible material.

It will be apparent from the preceding description of the igniter and servo mechanism that ignition of the rocket motor 20 can be timed to start at any desired instant during the upward movement of the outer tubular member 12 of the gun catapult, since the timing of servo mechanism actuation is controlled by the location of the outlet ports 59 along the length of the outer tubular member. The interval between uncovering of the ports 69 and development of full power by the rocket motor is a matter of a hundredth of a second, because all portions of the propellant charge are ignited substantially simultaneously by the igniter, rather than relying upon combustion of some portions of the propellant pile to ignite other portions thereof. Combustion of the propellant pile is also expedited and made more dependable by the provision of detonators at both ends of the igniter, so that flame is propagated along the igniter from each end thereof. The servo mechanism arrangement of course insures exactly simultaneous actuation of the detonators.

Figure 11:
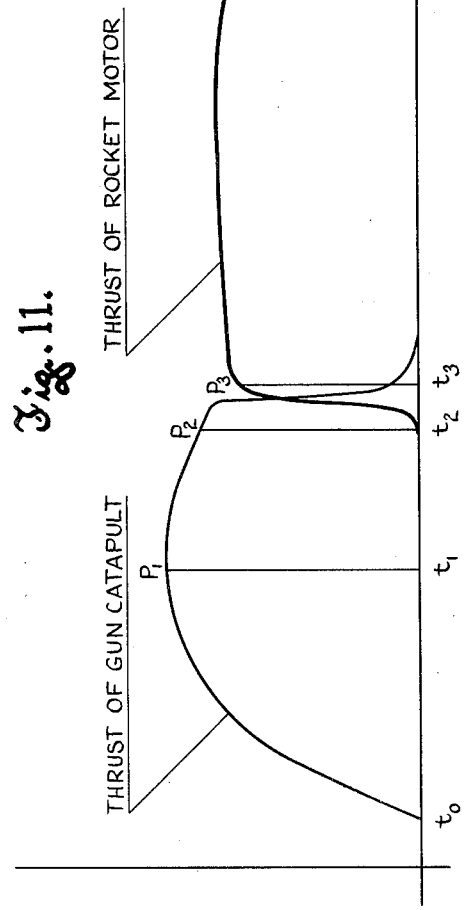
FIGURE 11 is a graph of the ejection thrust forces acting upon an ejection seat embodying the principles of this invention in the course of the two stages of its propulsion, first by the catapult gun and then by the rocket motor.

As indicated by FIGURE 11, a substantially smooth and continuous acceleration of the seat is obtained through the two stages of ejection propulsion by reason of the synchronization of the gun catapult and rocket motor. After the airman actuates the ejection mechanism to ignite the powder charge of the catapult gun, at the moment $t_0$, gas pressure rapidly and steadily increases in the catapult chamber as the powder charge of the catapult gun is combusted, and the thrust force of the catapult reaches its highest value $p_1$ at the instant $t_1$ when the inner tubular member has moved about halfway to the point where it uncovers the outlet ports 59. After this point there is a steady but relatively small decrease in the acceleration force of the gun through the instant $t_2$ when the ports 59 are uncovered, so that at that instant the force of the gun is still at a high value designated by $p_2$. Shortly thereafter, at the instant $t_3$ when the gun catapult tubes fully separate, releasing gas pressure, the force exerted by the gun rapidly goes to zero, but this does not occur until after the rocket motor has come up to substantially full propelling force $p_3$. Note that during the very brief interval from $t_2$ to $t_3$ the rapidly declining thrust force of the gun catapult is supplemented by the rapidly increasing thrust output of the rocket motor, so that the cumulative thrust of the two propulsion means affords a substantially steady, uniform acceleration of the seat. Because the total area of the combusting faces of the fuel elements of the rocket motor remains constant as the propellant charge burns, due to the restriction or insulation 32 on the peripheral surfaces of the fuel elements, the rocket motor exerts a substantially constant thrust from at or very shortly after the instant $t_3$ until the fuel elements are burned to the point where they no longer hold together.

It will be apparent that if the outlet ports 59 are spaced too far above the mouth of the outer tubular member, the rocket motor will come into action while the gun catapult is still exerting a high thrust force, and the combined thrust forces of the gun catapult and rocket motor will exert an intolerably high acceleration force upon the seat occupant. On the other hand, if the outlets 59 are located too close to the mouth of the outer tubular member, there will be a discontinuity in acceleration before the rocket motor takes over, and such a discontinuity, unless of very short duration, would also be detrimental to the seat occupant. However, tests have shown that it is easy to achieve a very precise synchronization of the two propulsion stages, so that both of the above mentioned undesirable conditions can be readily avoided, because of the rapidity with which the rocket motor of this invention ignites and comes up to full thrust development and the facility with which its timing can be correlated with operation of the catapult through proper location of the outlet ports 59 along the length of the outer tubular member 12.

It is to be observed that the interconnection of the two propulsion stages by means of the above described servo mechanism does not effect any real transfer of energy between the catapult gun and the rocket motor, and does not permit the combustion gases from one to pass to the other. Thus the uncovering of ports 59 merely effects transmission of an impulse or signal from one of the propulsion power sources to the other, and the piston 55 or diaphragm 55' which converts this impulse into an initiating force serves as a pressure sensitive wall that prevents actual flow of gases between the gun catapult and the rocket motor.

The covers or caps 27 on the discharge nozzels help to accelerate combustion of the rocket propellant because they serve to confine the combustion gases of the propellant fuel to the interior of the casing 21 until pressure therein reaches the value at which the covers blow off of the nozzles.

In the modified embodiment of the rocket motor illustrated in FIGURES 5 and 6, the igniter 40 extends through a central hole in each fuel element, and the several disc-like fuel elements are mounted on a frame consisting of three sleeves 35' which extend through closely fitting holes in each fuel element. The sleeves 35' are of course radially spaced from the igniter and are spaced approximately equal distances from one another so that the fuel elements will be more firmly fixed in their positions in the pile and so that disintegration of the fuel elements near the end of their combustion period will be somewhat delayed due to the greater number of points at which they are anchored, thus affording a somewhat longer period of propulsion by the rocket motor.

The rocket motor of this invention, in any of its embodiments, can be readily secured to the underside of the pan 6 of an ejection seat, as for example by means of flanges 65 which can be integral with the end closures or secured to them. The motor is of course mounted with the axis of its casing normal to the plane of symmetry of the seat, and with its nozzles arranged symmetrically at opposite sides of said plane. It is important that the casing be so disposed that the axes of the discharge nozzles, when extended upwardly, pass through a horizontal line that is just forward of the center of gravity 66 of the mass comprising the seat, its occupant, and all equipment attached to the seat for ejection with it. This relationship is indicated in FIGURE 1. With the thrust axis of the rocket motor so disposed in relation to the center of gravity, the thrust of the rocket counteracts the tendency toward forward rotation of the seat which otherwise develops after the seat has left the airplane and which is due to the force of the ejection gun, exerted rearwardly of the center of gravity. It will be apparent that the rocket motor can be readily adjusted to accommodate slight forward and rearward variations of the location of the center of gravity, merely by rotatably adjusting the motor about the longitudinal axis of its casing.

Because of the substantially radial flow of combustion gases from each fuel element directly to its nearest outlet, the pressures at the several nozzles are equal without the need for any substantial flow of gas lengthwise of the casing, thus assuring that all of the nozzles will produce equal thrust.

From the foregoing description taken together with the accompanying drawings it will be apparent that this invention provides a rocket motor which is particularly well adapted for ejection seat propulsion, and which is especially well suited for cooperation with a gun catapult to provide second stage propulsion of such an emergency escape device. It will also be apparent that the rocket motor of this invention comes up to full thrust very rapidly, maintains a substantially uniform thrust until burn-out, can be readily synchronized with an ejection gun, and be easily mounted to dispose its thrust axis in a desired relation to the center of gravity of the seat mass.

What is claimed as my invention is:

1. A rocket motor for propelling an aircraft ejection seat comprising:
   (A) means defining an elongated tubular casing having closed ends and having a plurality of lengthwise spaced apart openings through its tubular wall, along one side thereof, defining gas discharge nozzles which have their axes substantially normal to the axis of the casing and parallel to one another and which all open in the same direction;
   (B) a plurality of solid fuel propellant elements in the casing;
   (C) means holding the propellant elements substantially aligned with one another along the length of the casing, so that gases generated by combustion of the elements can flow from each element through the nearest nozzle along a substantially straight path, radially relative to the casing, said means also holding the elements spaced from the inner surface of the tubular casing wall along one side thereof to define a lengthwise extending passage through the casing along which combustion gases can flow to equalize the pressures at the several nozzles;
   (D) an igniter extending through a substantial portion of the length of the casing so that every propellant element is near a portion of the igniter, said igniter comprising
      (1) a body of readily combustible material and
      (2) a holder which confines said body of material but permits hot gases of its combustion to pass into contact with the fuel elements;
   (E) a detonator secured at one end of the igniter and in operative relation to it so that detonation of the detonator initiates combustion of the combustible material of the igniter; and
   (F) actuating means operable from outside the casing for detonating the detonator.

2. The rocket motor of claim 1, further characterized by the following:
   (A) all of said propellant elements are substantially identical to one another in shape and size; and
   (B) said means holding the propellant elements comprises spacers disposing them at axially equispaced intervals along the length of the casing to define radially opening passages between axially adjacent faces of the propellant elements through which gases from combustion of each propellant element can flow to the nearest nozzle.

3. The rocket motor of claim 2 wherein each of said propellant elements is substantially disc-shaped, having a pair of axially opposite faces and a peripheral edge surface, further characterized by a combustion restricting coating on the peripheral edge surface of each propellant element whereby combustion is substantially confined to said faces of the element.

4. The rocket motor of claim 1, further characterized by a pressure responsive closure blocking each of said outlets and adapted to be displaced by gas pressure in the casing in excess of a predetermined value, whereby ignition of all of the propellant elements is assured before the closures are displaced and gas is permitted to issue from the nozzles.

5. The rocket motor of claim 1, wherein said igniter extends through the entire length of the casing, further characterized by:
   (A) a second detonator at the other end of the igniter, in operative relationship to the igniter; and
   (B) second actuating means operatively associated with said second detonator for detonating the same simultaneously with detonation of the first detonator.

6. In an aircraft escape device of the type comprising a seat that is substantially symmetrical about a vertical plane and is jettisonably mounted in an aircraft, means for propelling the seat clear of the aircraft comprising:
   (A) an elongated tubular casing having closed ends and having lengthwise spaced apart outlets through its tubular wall, at one side thereof, defining gas discharge nozzles which have their axes substantially normal to the axis of the casing and parallel to one another and which all open in the same direction;
   (B) a plurality of solid fuel propellant elements in the casing arranged at spaced intervals along the length of the casing so as to define radially opening gas passages between adjacent elements by which combustion gas can flow in a substantially straight path substantially radial to the casing axis from each element to the nozzle nearest thereto;
   (C) igniter means in the casing for initiating combustion of the fuel elements, said igniter means comprising
      (1) a body of readily combustible material and
      (2) a detonator at one end of the casing;
   (D) means on the casing, actuatable from the exterior thereof, for detonating the detonator of the igniter means; and
   (E) means mounting the casing on the seat with its axis normal to said vertical plane and with its nozzles opening downwardly.

7. In an aircraft escape device of the type comprising a seat that is substantially symmetrical about a fore-and-aft extending vertical plane and is jettisonably mounted in an aircraft, means for propelling the seat clear of the aircraft comprising:
   (A) a catapult gun for first stage seat propulsion of the type comprising
      (1) a pair of telescoping tubular members having their axis substantially upright and on said plane,
         (a) one of said tubular members being connected to the seat
         (b) and the other being adapted for attachment to an airplane in which the seat is carried, and
      (2) a charge of readily combustible material confined within the telescoped tubular members and which by its combustion generates gas under pressure for driving the first mentioned tubular member upwardly;
   (B) a rocket motor for second stage seat propulsion comprising
      (1) an elongated tubular casing having closed ends and having lengthwise spaced apart outlets through its tubular wall, at one side thereof, defining gas discharge nozzles which have their axes substantially normal to the axis of the casing and parallel to one another,
      (2) a plurality of solid fuel propellant elements in the casing, aligned along the length thereof, from each of which combustion gas can flow in a substantially straight path to the nearest nozzle, and
      (3) igniter means in the casing for initiating combustion of the fuel elements, said igniter means comprising
         (a) a body of readily combustible igniter material and
         (b) a detonator at one end of the casing;
   (C) means mounting the rocket motor casing beneath the seat with its axis normal to said plane and with the nozzles symmetrically disposed at opposite sides of said plane;
(D) gas pressure responsive actuating means for said detonator; and
(E) means providing for establishment of a gas conducting connection between the interior of the catapult gun and the gas pressure responsive actuating means at a predetermined point in the upward motion of said first mentioned tubular member, whereby gas from the interior of the catapult gun is conducted to the actuating means to thus start the rocket motor at a predetermined point during first stage propulsion of the seat.

8. The aircraft escape device of claim 7, further characterized by the following:
(A) the igniter means comprises
(1) a tube of noncombustible material having a substantially smaller diameter than the casing and having a plurality of openings in its wall, said tube extending substantially the entire length of the casing and having said body of igniter material therein, and
(2) a second detonator at the other end of the casing;
(B) second gas pressure responsive actuating means for said second detonator; and
(C) means providing for establishment of a second gas conducting connection between the interior of the catapult gun and the second actuating means for detonating the second detonator simultaneously with detonation of the first mentioned detonator.

9. A rocket motor particularly intended for ejection seat propulsion characterized by the following:
(A) an elongated casing having closed ends and having a plurality of discharge outlets at one side thereof which are spaced at intervals along the length of the casing with their axes transverse to that of the casing and parallel to one another;
(B) a propellant in the casing comprising a plurality of substantially identical solid fuel elements, each having a pair of opposite faces at which all combustion of the element is intended to take place, and having a combustion inhibiting coating on its peripheral surface;
(C) means mounting the fuel elements at lengthwise spaced intervals along the casing with said faces of each element facing lengthwise of the casing and cooperating with corresponding faces of the adjacent elements to define radial passages in the casing that open substantially directly to the outlets; and
(D) igniter means comprising a body of fast burning material extending through substantially the entire length of the casing so that every fuel element is close to a portion of said body of fast burning material to thus assure that all of the fuel elements will be ignited substantially simultaneously.

10. The rocket motor of claim 9, further characterized by the following: a pressure displaceable closure over each of said outlets by which foreign matter is prevented from entering the casing before the rocket motor is operated, and by which combustion gases are held in the casing until a gas pressure of a predetermined value is attained in the casing to insure complete and rapid ignition of all of the fuel elements, said closures being adapted to be blown away from the outlets, to clear the same, by gas pressure in the casing in excess of said value.

11. The rocket motor of claim 9, further characterized by the following:
(A) A detonator at each end of the igniter for initiating combustion of said body of fast burning material; and
(B) means for actuating said detonators simultaneously.

References Cited by the Examiner
UNITED STATES PATENTS

| | | | |
|---|---|---|---|
| 2,434,652 | 1/48 | Hickman | 20—35 |
| 2,510,147 | 6/50 | Skinner | 102—49 |
| 2,633,702 | 4/53 | Hickman | 102—49 |
| 2,697,325 | 12/54 | Spaulding | 102—49 |
| 2,703,960 | 3/55 | Prentiss | 102—49 |
| 2,712,283 | 7/55 | Golden | 102—49 |
| 3,124,324 | 3/64 | Martin | 244—122 |

FERGUS S. MIDDLETON, *Primary Examiner.*